(12) United States Patent
Clausen

(10) Patent No.: US 9,655,059 B2
(45) Date of Patent: May 16, 2017

(54) COMMUNICATION TERMINAL AND METHOD FOR DETERMINING A POWER SCALING FACTOR

(71) Applicant: Intel Corporation, Santa Clara, CA (US)

(72) Inventor: Axel Clausen, Munich (DE)

(73) Assignee: Intel IP Corporation, Santa Clara, CA (US)

(*) Notice: Subject to any disclaimer, the term of this patent is extended or adjusted under 35 U.S.C. 154(b) by 197 days.

(21) Appl. No.: 14/556,863

(22) Filed: Dec. 1, 2014

(65) Prior Publication Data

US 2015/0208362 A1   Jul. 23, 2015

(30) Foreign Application Priority Data

Jan. 20, 2014   (DE) .................. 10 2014 100 595

(51) Int. Cl.
*H04W 52/24*   (2009.01)
*H04W 52/38*   (2009.01)

(52) U.S. Cl.
CPC ........ *H04W 52/243* (2013.01); *H04W 52/386* (2013.01)

(58) Field of Classification Search
CPC .................. H04W 52/243; H04W 52/386
See application file for complete search history.

(56) References Cited

U.S. PATENT DOCUMENTS

| | | | | |
|---|---|---|---|---|
| 2009/0291700 A1* | 11/2009 | Callard | ............... | H04W 72/085 455/503 |
| 2013/0301451 A1* | 11/2013 | Siomina | ............... | H04W 24/00 370/252 |
| 2014/0010267 A1* | 1/2014 | Jacob | ............... | H04L 1/20 375/219 |
| 2014/0187282 A1* | 7/2014 | Sankaran | ........... | H04W 52/343 455/522 |
| 2014/0241404 A1* | 8/2014 | Liew | ................ | H04W 72/1231 375/211 |
| 2016/0044523 A1* | 2/2016 | Koivisto | ............... | H04B 7/024 370/252 |

* cited by examiner

*Primary Examiner* — Duc C Ho
(74) *Attorney, Agent, or Firm* — Schiff Hardin LLP

(57) ABSTRACT

A communication terminal is described comprising a receiver configured to receive first signals on a first set of communication resources and to receive a plurality of second signals on a second set of communication resources and an interference control unit configured to determine a level of interference of one or more interferers included in the plurality of second signals and to determine a power scaling factor of signal components of the first signals based on the level of interference by the one or more interferers.

23 Claims, 9 Drawing Sheets

US 9,655,059 B2

COMMUNICATION TERMINAL AND METHOD FOR DETERMINING A POWER SCALING FACTOR

RELATED APPLICATION

This application claims priority to German Application No. 10 2014 100 595.3, filed on Jan. 20, 2014.

TECHNICAL FIELD

Embodiments described herein generally relate to communication terminals and methods for determining a power scaling factor.

BACKGROUND

A base station according to a mobile communication standard, such as LTE, typically applies varying power scaling values for resource elements transporting payload data to a mobile terminal relative to resource elements used for the transmission of reference symbols to the mobile terminal. For higher modulation orders the base station informs the terminal about the scaling factor that is applied. However, for certain QPSK transmissions (e.g. Rank 1 transmission), the scaling factor is typically not communicated. Since in scenarios with strong interference, e.g. from base stations operating cells neighboring the terminal's serving cell the estimation process of the scaling factor is typically very complex, efficient approaches to estimate a scaling factor in such scenarios are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
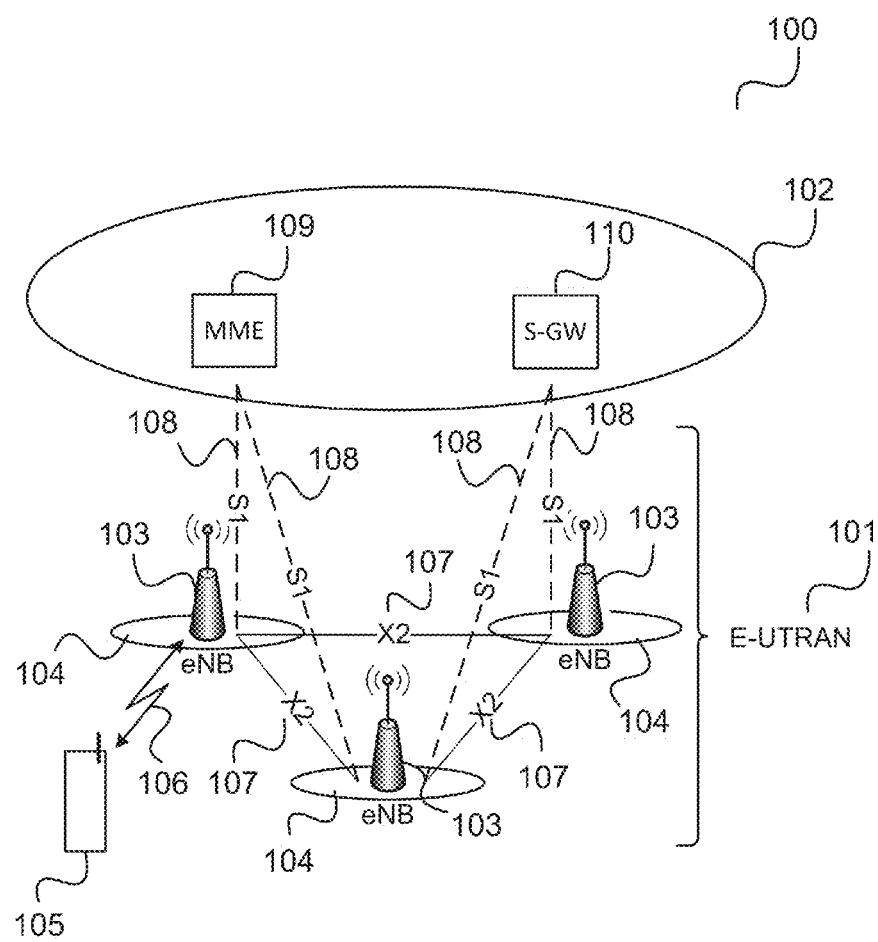
FIG. 1 shows a communication system according to an exemplary mobile communication standard.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to a mobile communication standard, such as LTE (Long Term Evolution), or LTE-Advanced) 101, and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced).

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

A base station (eNodeB) 103 according to LTE typically applies varying power scaling values for resource elements transporting payload data relative to resource elements used for the transmission of reference symbols. These scaling values are adopted by the eNodeB 103 due to network conditions and the location of the mobile device (UE) 105. For higher modulation orders (such as QAM 16, QAM 64), the eNodeB 103 informs the UE 105 about the scaling factor which is applied. However, for QPSK (Quadrature Phase Shift Keying) transmissions, the scaling factor is typically not communicated and the UE 105 needs to perform an estimation of this factor for various algorithms. In scenarios where there is no interference from other radio cells to the transmission of the UE's serving base station 103, the UE 105 can typically estimate the scaling factor reliably. However, in scenarios with strong interference, e.g. from base stations operating cells neighboring the UE's serving cell this estimation process typically becomes more complex.

For example, the knowledge of the power scaling factor factor $\rho_A$ of the serving cell for QPSK transmissions according to LTE is required for certain estimation processes used for example for interference mitigation. Other power scaling factors such as the power scaling factor $\rho_B$ of the serving cell according to LTE can be derived from $\rho_A$ as the ratio of $\rho_A$ and $\rho_B$ is a cell specific parameter which is known by the UE.

Accordingly, in the following, an approach for estimation of a power scaling value, e.g. the power scaling factor $\rho_A$ of the serving cell for QPSK transmissions according to LTE, which may for example be applied in scenarios with multiple interfering cells is described.

Figure 2:
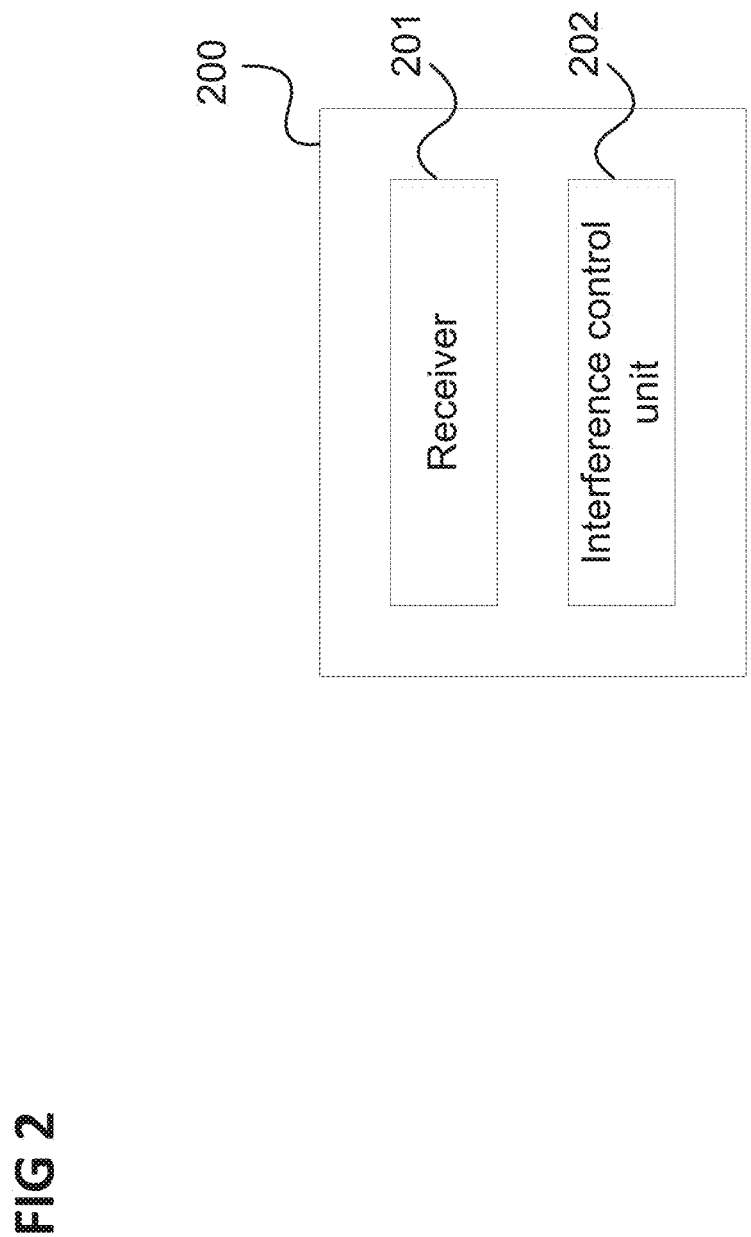
FIG. 2 shows a communication terminal configured to determine a power scaling factor based on the level of interference by one or more interferers.

FIG. 2 shows a communication terminal 200.

The communication terminal 200 comprises a receiver 201 configured to receive a plurality of first signals on a first set of communication resources and to receive a plurality of second signals on a second set of communication resources.

The communication terminal 200 further comprises an interference control unit 202 (for example, a determiner) configured to determine a level of interference of one or more interferers included in the plurality of second signals and to determine a power scaling factor of a plurality of signal components of the plurality of first signals based on the level of interference by the one or more interferers.

It should further be noted that any noise source may be seen as an interferer. Accordingly, the interference may include noise (i.e. the level of interference may include a level of noise).

In other words, a communication terminal is for example provided which determines a power scaling factor of signals transmitted using a first set of communication resources by determining an interference based on signals received via a second set of communication resources.

It should be noted that the one or more interferers may be potential interferers, i.e. devices (or radio cells) operating on the first communication resources and the second communication resources. It should be noted that the one or more interferers do not necessarily have to cause interference to the first signals and the second signals. For example, the interference control unit may determine that some or all of the interferers do not cause interference to the second signals.

For example, the communication terminal performs estimates the $\rho_A$ power scaling value applied by its serving cell eNodeB in a QPSK transmission. For example, the communication terminal uses this estimation in case of PDCCH decoding or in case PDCCH decoding indicates that the PDSCH is using QPSK transmission.

To increase the performance (e.g. accuracy) of the estimation, the communication terminal may further use interfering cell scheduling information. For this, the communication terminal may determine information about the scheduling of interfering cells.

For example, the communication terminal may select the first set of communication resources and the second set of communication resources based on scheduling information about at least one of the one or more interferers. Specifically, the communication terminal may for example select the sets of communication resources based on the scheduling of colliding interfering cells, e.g. such that in few (or none) of the colliding interfering cells the communication resources are scheduled for data transmission. For example, the communication terminal may select a resource block for the determination of the power scaling factor which is not scheduled for data transmission in colliding interfering cells.

The components of the communication terminal (e.g. the interference control unit and the receiver) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 3:
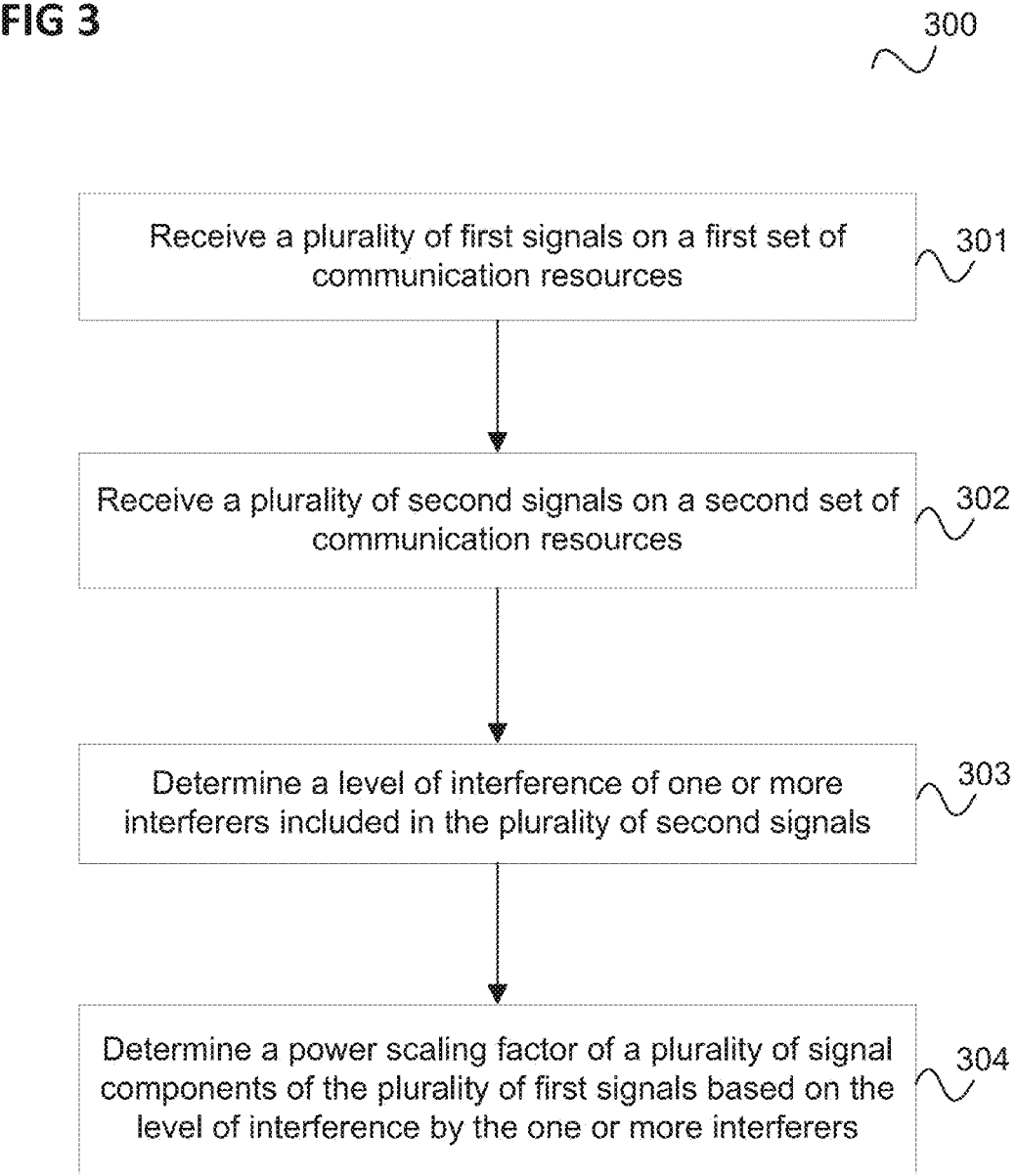
FIG. 3 shows a flow diagram illustrating a method for determining a power scaling factor.

The communication terminal 200 for example carries out a method as illustrated in FIG. 3.

FIG. 3 shows a flow diagram 300.

The flow diagram 300 illustrates a method for determining a power scaling factor, for example carried out by a communication terminal.

In 301, the communication terminal receives a plurality of first signals on a first set of communication resources.

In 302, the communication terminal receives a plurality of second signals on a second set of communication resources.

In 303, the communication terminal determines a level of interference of one or more interferers included in the plurality of second signals.

In 304, the communication terminal determines a power scaling factor of signal components of the plurality of first signals based on the level of interference by the one or more interferers.

The following examples pertain to further embodiments.

Example 1 is a communication terminal as illustrated in FIG. 2.

In Example 2, the subject matter of Example 1 can optionally include the interference control unit being configured to cancel the interference of the one or more interferers included in the plurality of first signals using the level of interference.

In Example 3, the subject matter of any one of Examples 1-2 can optionally include the interference control unit being configured to cancel influence of interference of the one or more interferers on reception power of the first set of communication resources using the level of interference on the second set of communication resources.

In Example 4, the subject matter of any one of Examples 1-3 can optionally include the level of interference on the second set of communication resources being a power level of interference and determining the power scaling factor comprising subtracting the level of interference from the power of the plurality of first signals and determining the power scaling factor based on the power resulting from the subtraction.

In Example 5, the subject matter of any one of Examples 1-4 can optionally include the interference control unit being configured to determine the power scaling factor based on a normalization of the power resulting from the subtraction.

In Example 6, the subject matter of Example 5 can optionally include the interference control unit being configured to normalize the power resulting from the subtraction by an estimate of the power of the plurality of first signals.

In Example 7, the subject matter of any one of Examples 1-6 can optionally include the first set of communication resources being a set of resource elements scheduled for the communication for reception of signals scaled with the power scaling factor.

In Example 8, the subject matter of any one of Examples 1-7 can optionally include the second set of communication resources being a set of resource elements scheduled for the communication for reception of signals scaled with a further power scaling factor different from the power scaling factor.

In Example 9, the subject matter of any one of Examples 1-8 can optionally include the second set of communication resources being a set of resource elements scheduled for the communication for reception of unscaled signals.

In Example 10, the subject matter of any one of Examples 1-9 can optionally include the first set of communication resources being a set of resource elements scheduled for the communication terminal for data reception.

In Example 11, the subject matter of any one of Examples 1-10 can optionally include the second resource elements being resource elements scheduled for the communication terminal for pilot signal reception.

In Example 12, the subject matter of any one of Examples 1-11 can optionally include the communication terminal being served by a serving radio cell and the one or more interferers including other radio cells neighboring the serving radio cell.

In Example 13, the subject matter of Example 12 can optionally include a plurality of signal components of the plurality of first signals being signals sent to the communication terminal by a base station operating the serving radio cell.

In Example 14, the subject matter of any one of Examples 1-13 can optionally include the communication terminal comprising a selector configured to select the first set of communication resources and the second set of communication resources based on scheduling information about at least one of the one or more interferers.

In Example 15, the subject matter of Example 14 can optionally include the scheduling information specifying whether the at least one of the one or more interferers has scheduled data transmission using the first set of communication resources.

In Example 16, the subject matter of any one of Examples 14-15 can optionally include the first set of communication resources and the second set of communication resources being communication resources of a resource block and the selector being configured to select the resource block based on the scheduling information.

In Example 17, the subject matter of any one of Examples 1-16 can optionally be a user equipment according to a mobile communication standard (e.g. LTE).

In Example 18, the subject matter of any one of Examples 1-17 can optionally include the signal components of the plurality of first signals being signals sent to the communication terminal by an eNodeB according to a mobile communication standard (e.g. LTE).

Example 19 is a method for determining a power scaling factor as illustrated in FIG. 3.

In Example 20, the subject matter of Examples 19 can optionally include canceling the interference of the one or more interferers included in the plurality of first signals using the level of interference.

In Example 21, the subject matter of any one of Examples 19-20 can optionally include canceling influence of interference of the one or more interferers on reception power of the first set of communication resources using the level of interference on the second set of communication resources.

In Example 22, the subject matter of any one of Examples 19-21 can optionally include the level of interference on the second set of communication resources being a power level of interference and determining the power scaling factor comprising subtracting the level of interference from the power of the plurality of first signals and determining the power scaling factor based on the power resulting from the subtraction.

In Example 23, the subject matter of any one of Examples 19-22 can optionally include determining the power scaling factor based on a normalization of the power resulting from the subtraction.

In Example 24, the subject matter of Example 23 can optionally include normalizing the power resulting from the subtraction by an estimate of the power of the plurality of first signals.

In Example 25, the subject matter of any one of Examples 19-24 can optionally include the first set of communication resources being a set of resource elements scheduled for the communication for reception of signals scaled with the power scaling factor.

In Example 26, the subject matter of any one of Examples 19-25 can optionally include the second set of communication resources being a set of resource elements scheduled for the communication for reception of signals scaled with a further power scaling factor different from the power scaling factor.

In Example 27, the subject matter of any one of Examples 19-26 can optionally include the second set of communication resources being a set of resource elements scheduled for the communication for reception of unscaled signals.

In Example 28, the subject matter of any one of Examples 19-27 can optionally include the first set of communication resources being a set of resource elements scheduled for data reception.

In Example 29, the subject matter of any one of Examples 19-28 can optionally include the second set of communication resources being a set of resource elements scheduled for pilot signal reception.

In Example 30, the subject matter of any one of Examples 19-29 can optionally include being performed by a communication terminal served by a serving radio cell and the one or more interferers including other radio cells neighboring the serving radio cell.

In Example 31, the subject matter of Example 30 can optionally include the signal components of the plurality of first signals being signals sent to the communication terminal by a base station operating the serving radio cell.

In Example 32, the subject matter of any one of Examples 19-31 can optionally include selecting the first set of communication resources and the second set of communication resources based on scheduling information about at least one of the one or more interferers.

In Example 33, the subject matter of Example 32 can optionally include the scheduling information specifying whether the at least one of the one or more interferers has scheduled data transmission using the first set of communication resources.

In Example 34, the subject matter of any one of Examples 32-33 can optionally include the first set of communication resources and the second set of communication resources being communication resources of a resource block and the selector being configured to select the resource block based on the scheduling information.

In Example 35, the subject matter of any one of Examples 19-34 can optionally include being performed by a user equipment according to a mobile communication standard (e.g. LTE).

In Example 36, the subject matter of any one of Examples 19-35 can optionally include the signal components of the plurality of first signals being signals sent by an eNodeB according to a mobile communication standard (e.g. LTE).

Example 37 is a computer readable medium having recorded instructions thereon which, when executed by a processor, make the processor perform a method for performing radio communication according to any one of Examples 19 to 36.

Example 38 is a communication terminal comprising a receiving means configured to receive a plurality of first signals on a first set of communication resources and to receive a plurality of second signals on a second set of communication resources; an interference control means (e.g. a determining means) configured to determine a level of interference of one or more interferers included in the plurality of second signals and to determine a power scaling factor of signal components of the plurality of first signals based on the level of interference by the one or more interferers.

In Example 39, the subject matter of Example 38 can optionally include the interference control unit being configured to cancel the interference of the one or more interferers included in the plurality of first signals using the level of interference.

In Example 40, the subject matter of any one of Examples 38-39 can optionally include the interference control means being configured to cancel the influence of interference of the one or more interferers on the reception power on the first resource elements using the level of interference on the second resource elements.

In Example 40, the subject matter of any one of Examples 38-40 can optionally include the level of interference on the second resource elements is a power level of interference and determining the power scaling factor comprises subtracting the level of interference from the power of the plurality of first signals and determining the power scaling factor based on the power resulting from the subtraction.

In Example 40, the subject matter of any one of Examples 38-41 can optionally include the interference control means being configured to determine the power scaling factor based on a normalization of the power resulting from the subtraction.

In Example 43, the subject matter of Examples 42 can optionally include the interference control means being configured to normalize the power resulting from the subtraction by an estimate of the power of the plurality of first signals.

In Example 44, the subject matter of any one of Examples 38-43 can optionally include the first resource elements being resource elements scheduled for the communication for reception of signals scaled with the power scaling factor.

In Example 45, the subject matter of any one of Examples 38-44 can optionally include the second resource elements being resource elements scheduled for the communication for reception of signals scaled with a further power scaling factor different from the power scaling factor.

In Example 46, the subject matter of any one of Examples 38-45 can optionally include the second resource elements being resource elements scheduled for the communication for reception of unscaled signals.

In Example 47, the subject matter of any one of Examples 38-46 can optionally include the first resource elements being resource elements scheduled for the communication terminal for data reception.

In Example 48, the subject matter of any one of Examples 38-47 can optionally include the second resource elements being resource elements scheduled for the communication terminal for pilot signal reception.

In Example 49, the subject matter of any one of Examples 38-48 can optionally include the communication terminal being served by a serving radio cell and the one or more interferers including other radio cells neighboring the serving radio cell.

In Example 50, the subject matter of Examples 49 can optionally include the signal components of the plurality of first signals being signals sent to the communication terminal by a base station operating the serving radio cell.

In Example 51, the subject matter of any one of Examples 38-50 can optionally include the communication terminal comprising a selector configured to select the first set of communication resources and the second set of communication resources based on scheduling information about at least one of the one or more interferers.

In Example 52, the subject matter of Example 51 can optionally include the scheduling information specifying whether the at least one of the one or more interferers has scheduled data transmission using the first set of communication resources.

In Example 53, the subject matter of any one of Examples 51-52 can optionally include the first set of communication resources and the second set of communication resources being communication resources of a resource block and the selector being configured to select the resource block based on the scheduling information.

In Example 54, the subject matter of any one of Examples 38-53 can optionally be a user equipment according to a mobile communication standard (e.g. LTE).

In Example 55, the subject matter of any one of Examples 38-54 can optionally include the signal components of the plurality of first signals being signals sent to the communication terminal by an eNodeB according to a mobile communication standard (e.g. LTE).

It should be noted that one or more of the features of any of the examples above may be combined with any one of the other examples.

In the following, examples for the communication terminal 200 and the method illustrated in FIG. 3 are described in more detail. The following examples are based on a communication system as illustrated in FIG. 1.

Figure 4:
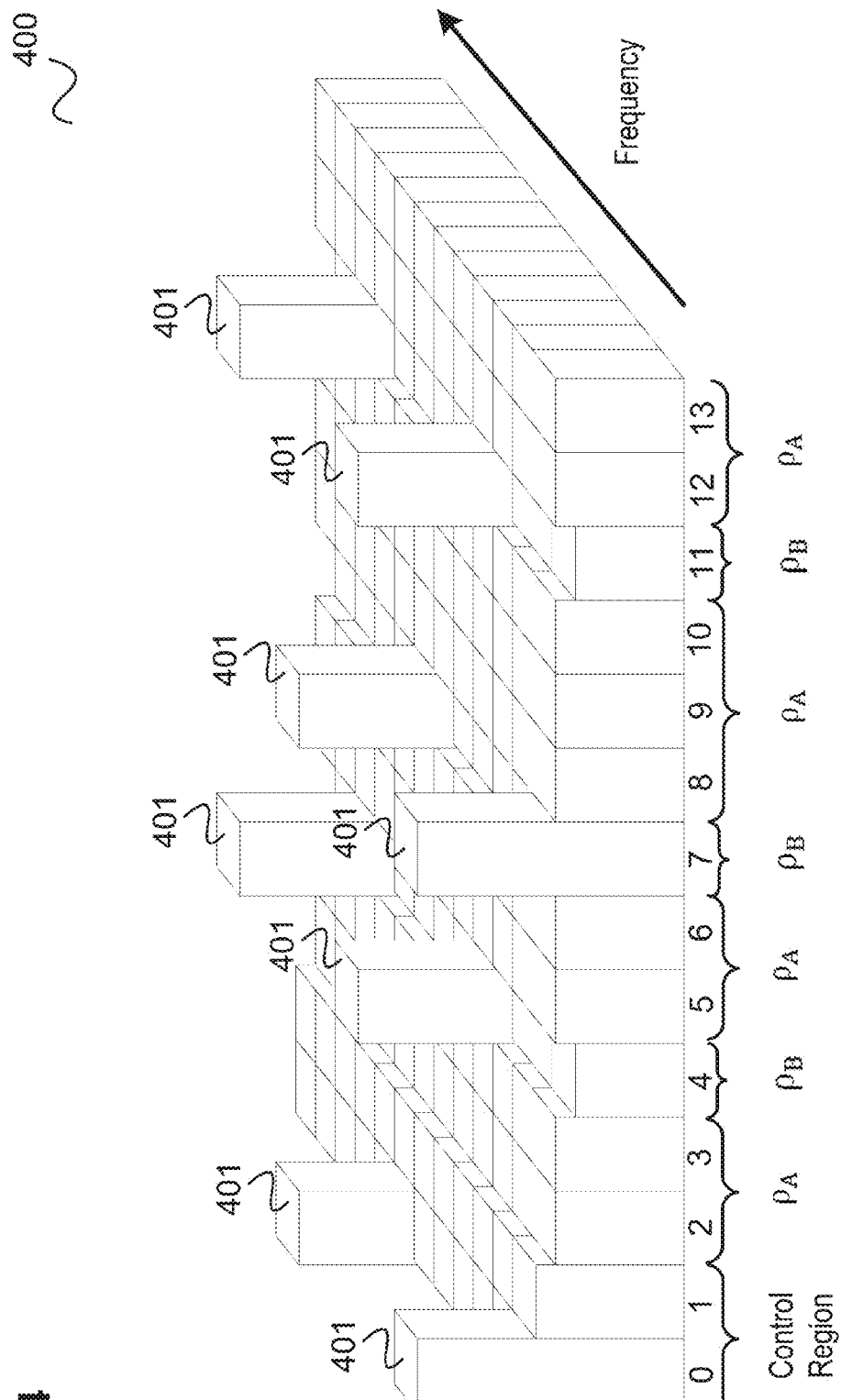
FIG. 4 shows a radio resource power scaling diagram.

In a transmission, the PDSCH resource elements are typically scaled with two different power scaling factors $\rho_A$ and $\rho_B$ as it is illustrated in FIG. 4.

FIG. 4 shows a radio resource power scaling diagram 400.

The radio resource power scaling diagram 400 shows a plurality of boxes arranged in a matrix. Each box represents a resource element for an OFDM transmission. Each resource element corresponds to a transmission time and a subcarrier frequency wherein time increases from left to right and frequency increases from front to back. The resource elements shown correspond to one subframe: 14 resource elements in time (in the following numbered from 0 to 13) and 12 subcarriers. The 12 resource elements for a certain time are used for the transmission of one OFDM symbol. The OFDM symbols are in the following also numbered 0 to 13 according to the time index of the resource elements.

In this example drawing, the OFDM symbols with indices 0 and 1 are allocated for PDCCH transmission by the base station (identified as control region in FIG. 4). The number of OFDM symbols used for the control region is variable and can vary between 1 and 3 symbols for all system bandwidth larger than 1.4 MHz.

In this example, the OFDM symbols with indices 2 to 13 are allocated for PDSCH transmission by the base station (eNB). The base station for example corresponds to the serving base station 103 of the UE 105, i.e. the base station operating the serving cell of the UE 105, i.e. the cell currently used for communication by the UE 105.

The height of a resource element illustrates the transmit power used by the base station for transmitting data using this resource element.

The largest boxes 401 represent resource elements that the base station uses for the transmission of cell specific reference signals (CRS) which are unscaled in this example. The set of resource elements containing CRS transmitted from the serving cell is denoted as $t^{CRS}$.

The eNodeB configures power values $P_A$ and $P_B$. The scaling factors $\rho_A$ and $\rho_B$ are derived from these parameters. As illustrated in FIG. 4, the base station uses the power scaling factor $\rho_A$ for the resource elements with time indices 2, 3, 5, 6, 8, 9, 10, 12, 13 (second to lowest resource elements in FIG. 4).

The set $t^{P_A}$ denotes the resource elements which are always scaled with $\rho_A$ on all cells, e.g. containing resource elements from OFDM symbols which cannot be assigned for PDCCH transmission and which cannot contain any CRS. The set $t^{P_A}$ does not necessarily contain all RE but it could as well being formed from a subset of these RE.

It should be noted that for the normal cyclic prefix, all resource elements of symbols with index 3, 5, 6, 9, 10, 12, 13 can be used for this resource element set. OFDM symbols with indices 0, 1, 2 may be used for PDCCH transmission with different power scaling than $\rho_A$ and OFDM symbols with indices 4, 7, 8, 11 may be used for CRS transmission and the resource elements of these OFDM symbols not used for CRS transmission may be scaled with $\rho_B$.

In the example shown in FIG. 4, only resource elements of OFDM symbols with index 0 and 1 are used for PDCCH transmission and only OFDM symbols with indices 4, 7 and 11 are used for CRS transmission. The base station uses the power scaling factor $\rho_B$ for the OFDM symbols with indices 4, 7 and 11 (lowest resource elements in FIG. 4), except for the reference signals which are transmitted unscaled as mentioned above.

The values $\rho_A$ and $\rho_B$ are typically UE specific. The ratio $\rho_B/\rho_A$ is typically cell specific.

In the following, a signal model for the signal received by the communication terminal is given that is used for the determination of the power scaling factor $\rho_A$ as described in the following. The signal model assumes a combination of colliding and non-colliding aggressors.

For the set $t^{P_A}$ the received signal is given as $$y(t^{P_A}) = H_0(t^{P_A}) \cdot W_{tx,0}(t^{P_A}) \cdot \sqrt{\rho_{A,0}} \cdot s_0(t^{P_A}) + \sum_{m \in I_{coll}} H_m(t^{P_A}) \cdot W_{tx,m}(t^{P_A}) \cdot \sqrt{\rho_{A,m}} \cdot s_m(t^{P_A}) + \sum_{n \in I_{non\text{-}coll}} H_n(t^{P_A}) \cdot W_{tx,n}(t^{P_A}) \cdot \sqrt{\rho_{A,n}} \cdot s_n(t^{P_A}) + z(t^{P_A})$$

where $s_k$ the transmitted signal, $H_k$ denotes the channel matrix for the signal $s_k$, $W_{tx,k}$ the precoding matrix used for the signal $s_k$ and $\rho_{A,k}$ the power scaling value $\rho_A$ used for transmission of the signal $s_k$. Here, k is the cell index where k=0 denotes the communication terminal's serving cell, and k=m denotes colliding aggressors and indices k=n denotes non-colliding aggressors. The additive white Gaussian noise is denoted as z. $I_{non\text{-}coll}$ and $I_{coll}$ are the sets of non-colliding aggressors and colliding aggressors, respectively.

The vectors y, z are $N_{rx} \times 1$ vectors and the matrices $H_k$ are $N_{rx} \times N_{tx,k}$ matrices and $W_{tx,k}$ are $N_{tx,k} \times N_{tx,k}$ matrices (where $N_{rx}$ denotes the number of receive antennas an $N_{tx}$ denotes the number of transmit antennas). The absolute value |.| of a vector or matrix as used in the following is for example the Euclidean norm of the vector or matrix.

The signal model for the set of serving cell CRS resource elements, i.e. the set $t^{CRS}$ is given as $$y(t^{CRS}) = H_0(t^{CRS}) \cdot s_0^{CRS}(t^{CRS}) + \sum_{m \in I_{coll}} H_m(t^{CRS}) \cdot s_m^{CRS}(t^{CRS}) + \sum_{n \in I_{non\text{-}coll}} H_n(t^{CRS}) \cdot W_{tx,n}(t^{CRS}) \cdot \sqrt{\rho_{B,n}} \cdot s_n(t^{CRS}) + z(t^{CRS})$$

with denotations as above wherein the signals transmitted in the serving cell (k=0) and in the colliding cells (k=m) are CRS signals and are accordingly marked with superscript CRS. For the non-colliding case, the power scaling factor is the $\rho_B$ of the respective cell.

Figure 5:
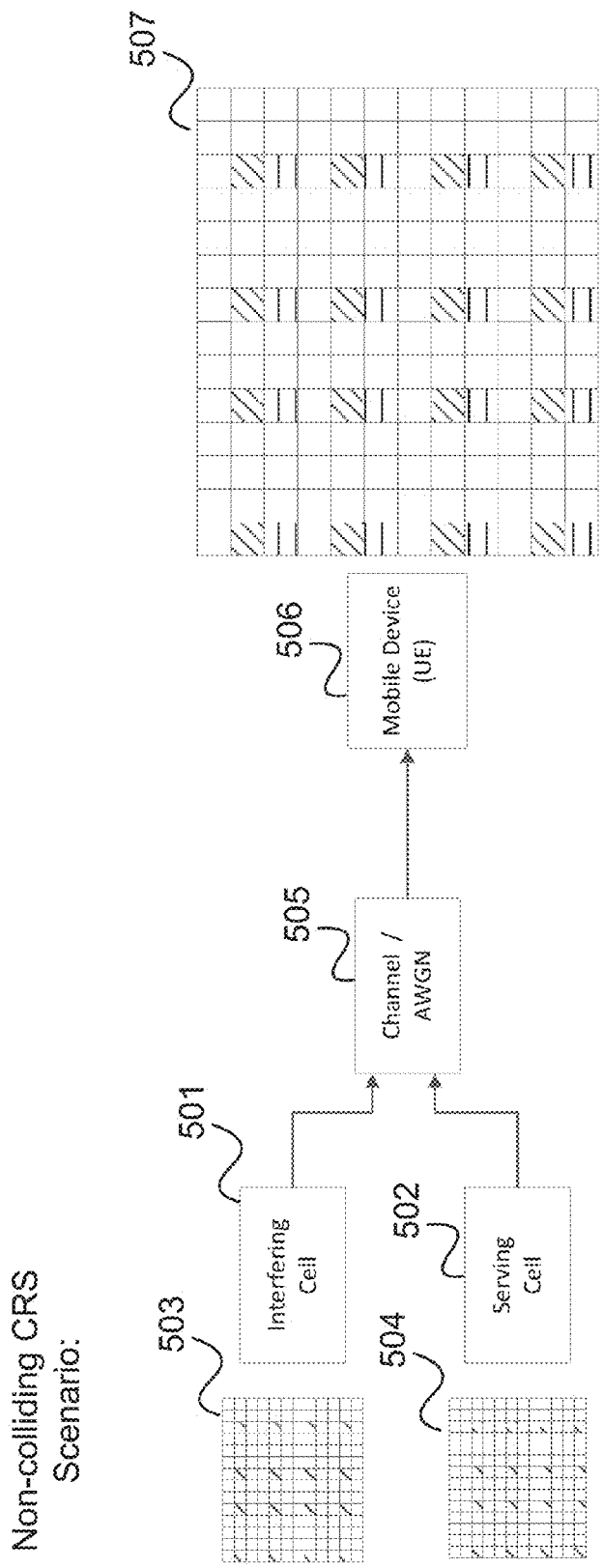
FIG. 5 illustrates interference by a non-colliding cell.
Figure 6:
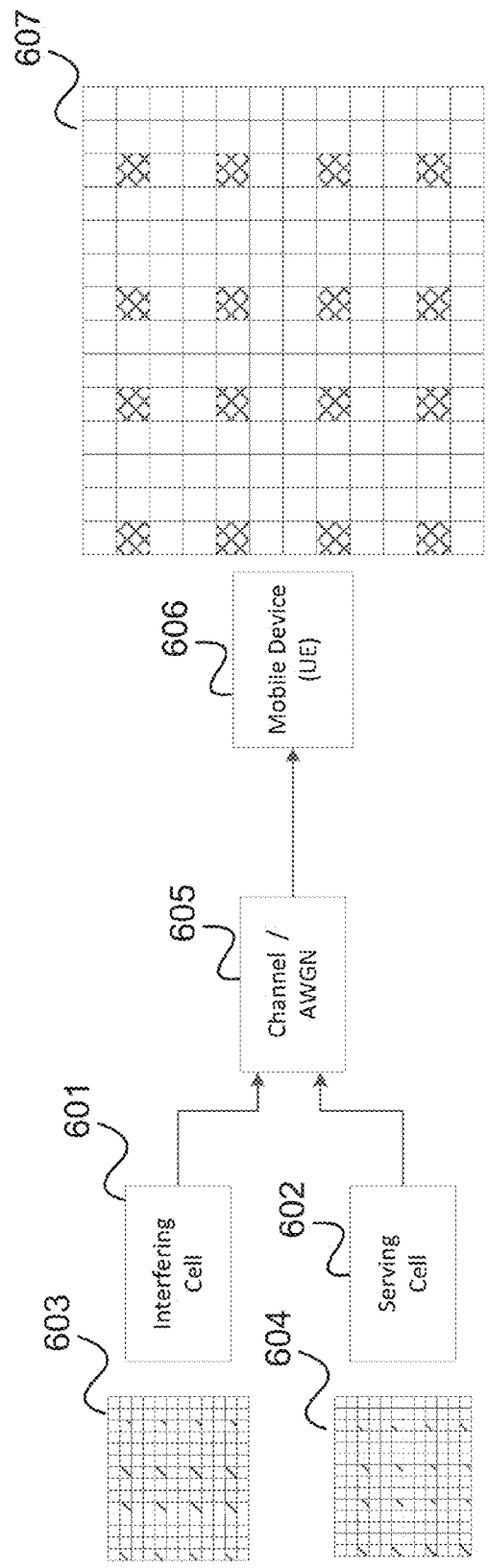
FIG. 6 illustrates interference by a colliding cell.

The distinction between colliding cells and non-colliding cells is illustrated in FIGS. 5 and 6.

FIG. 5 illustrates interference by a non-colliding cell.

In the non-colliding scenario as illustrated in FIG. 5, an interfering cell 501 (i.e. the base station operating the interfering cell) transmits the CRS signals on different resource elements than the serving cell 502 (i.e. the UE's serving base station), as illustrated by a resource block 503 for the interfering cell 501 and a resource block 504 for the serving cell 502 in which the resource elements used for CRS transmission are shown with diagonal hatching.

This means that after transmission via a channel 505 (including addition of average white Gaussian noise) in the resource block 507 received by the UE 506 there are, in the OFDM symbols including the resource elements used for CRS transmission, resource elements, indicated by horizontal hatching, which are used for data transmission and which experience interference from the CRS signals of the interfering cell 501.

FIG. 6 illustrates interference by a colliding cell.

In the colliding scenario as illustrated in FIG. 6, an interfering cell 601 (i.e. the base station operating the interfering cell) transmits the CRS signals on the same resource elements than the serving cell 602 (i.e. the UE's serving base station), as illustrated by a resource block 603 for the interfering cell 601 and a resource block 604 for the serving cell 602 in which the resource elements used for CRS transmission are shown with diagonal hatching.

This means that after transmission via a channel 505 (including addition of average white Gaussian noise) in the resource block 507 received by the UE 506 the resource elements used for CRS transmission experience interference from the CRS signals of the interfering cell 501 (indicated by cross hatching).

In the following, an example is given how the communication terminal 105 may estimate the power scaling factor $\rho_A$. This may be seen as an example of the interference control unit 202 of the communication terminal 200 wherein the first set of communication resources correspond to the resource element set $t^{\rho_A}$ and the second set of communication resources corresponds to the resource element set $t^{CRC}$.

The communication terminal computes an estimation $\hat{\rho}_{A,RB}$ for each resource block for, for example, a plurality of resource blocks. Therefore, an index RB is added to the various denotations as given above in the following to indicate that they refer to a certain resource block. The communication terminal determines the estimation for resource block RB as the ratio $$\hat{\rho}_{A,RB} = \frac{P_{\rho_A,RB} - P_{noise,RB}}{P_{serving,RB}}$$

where $P_{\rho_A,RB}$ is the estimated received power (summation of serving cell, interfering cells, and noise) on the resource elements scaled with $\rho_A$ (i.e. of set $t^{\rho_A}$) computed as $$P_{\rho_A,RB} = \frac{1}{N_{\rho_A,RB}} \sum_{t \in t^{\rho_A,RB}} |y(t)|^2$$

$P_{serving,RB}$ is the received power of the serving cell computed as $$P_{serving,RB} = \frac{1}{N_{CRS,RB}} \sum_{t \in t^{CRS,RB}} \{\hat{H}_0(t) \cdot \hat{H}_0(t)^H\}$$

(by assuming that $E[s_k^{CRS}(t^{CRS}) \cdot s_k^{CRS}(t^{CRS})^H]=1$) and the noise and interference power on the serving cell CRS positions is estimated per resource block as $$P_{noise,RB} = \frac{1}{N_{CRS,RB}} \sum_{t \in t^{CRS,RB}} |\breve{y}(t)|^2$$

where $\breve{y}(t^{CRS})$ denotes the received signal at the resource elements of set $t^{CRS}$ after subtraction of the remodulated serving cell signal and colliding signals, i.e.

$$\breve{y}(t^{CRS}) = $$
$$y(t^{CRS}) - \hat{H}_0(t^{CRS}) \cdot s_0^{CRS}(t^{CRS}) - \sum_{m \in I_{coll,schedRB}} \hat{H}_m(t^{CRS}) \cdot s_m^{CRS}(t^{CRS})$$

where $\hat{H}_k$ denotes the channel estimate of $H_k$. The set $I_{coll,schedRB}$ contains the colliding cells which have the resource block RB scheduled for data transmission. The colliding cell scheduling can be estimated by comparing the $P_{\rho_A,RB}$ to a threshold as described in more detail below.

$N_{\rho_A,RB} N_{CRS,RB}$ denote the number of elements of set $t^{\rho_A,RB}$ and $t^{CRS,RB}$, respectively.

In the following, it is shown that with the above definitions of $P_{\rho_A,RB}$, $P_{noise,RB}$ and $P_{serving,RB}$ the term $$\frac{P_{\rho_A,RB} - P_{noise,RB}}{P_{serving,RB}}$$

actually gives an estimate for $\rho_{A,RB}$. For this, the index RB for the current resource block is omitted for simplicity.

$P_{serving}$ can be rewritten as $$P_{serving} = \frac{1}{N_{CRS}} \sum_{t \in t^{CRS}} |H_0[t]|^2 + e_{serving}$$

wherein $e_{serving}$ the estimation errors.

$P_{noise}$ can be rewritten as $$P_{noise} = \sum_{n \in I_{non-coll,sched}} \rho_{B,n} \cdot |H_n[t]|^2 + |z[t]|^2 + e_{noise}$$

where $e_{noise}$ covers the estimation errors and wherein $I_{non-coll,sched}$ is the set of non-colliding cells which are scheduled for data transmission for the current resource block.

$P_{\rho_A,RB}$ can be rewritten as $$P_{\rho_A} = \rho_{A,0} \cdot |H_0[t]|^2 + \sum_{m \in I_{coll,sched}} \rho_{A,m} \cdot |H_m[t]|^2 +$$
$$\sum_{n \in I_{non-coll,sched}} \rho_{A,n} \cdot |H_n[t]|^2 + |z[t]|^2 + e_{\rho_A}$$

where $I_{coll,sched}$ is the set of colliding cells which are scheduled for the current resource block and $e_{\rho_A,RB}$ covers the estimation errors.

The difference $P_{\rho_A} - P_{noise}$ thus gives $$P_{\rho_A} - P_{noise} = \rho_{A,0} \cdot |H_0[t]|^2 + \sum_{m \in I_{coll,sched}} \rho_{A,m} \cdot |H_m[t]|^2 + \sum_{n \in I_{non-coll,sched}} (\rho_{A,n} - \rho_{B,n}) \cdot |H_n[t]|^2 + e_{diff}$$

where $e_{diff} = e_{\rho_A} - e_{noise}$.

It should be noted that $P_{noise}$ can be seen as an estimate for the interference of the non-colliding cells based on the resource elements of $t^{CRS}$ to the resource elements of $t^{PA}$. Indeed, if $\rho_{A,n}$ and $\rho_{B,n}$ are equal, the last sum in the above formula is zero and the interference of the non-colliding cells is completely canceled out. Thus, the subtraction of $P_{noise}$ from $P_{\rho_A}$ can be seen as taking into account a level of interference of one or more interferers included in the second signals (namely the signals received via the resource elements $t^{CRS}$) in the determination of the power scaling factor of signal components of the first signals (namely the signals received via the resource elements $t^{PA}$) as described with reference to FIG. 2.

With the above reformulation of $P_{noise}$ from $P_{\rho_A}$ the quotient $$\frac{P_{\rho_A} - P_{noise}}{P_{serving}}$$

gives $$\frac{P_{\rho_A} - P_{noise}}{P_{serving}} = \rho_{A,0} \cdot e_{quot} + \frac{\sum_{m \in I_{coll,sched}} \rho_{A,m} \cdot |H_m[t]|^2 + \sum_{n \in I_{non-coll,sched}} (\rho_{A,n} - \rho_{B,n}) \cdot |H_n[t]|^2 + e_{diff}}{|H_0[t]|^2 + e_{serving}}$$

where $$e_{quot} = \frac{1}{1 + \frac{e_{serving}}{|H_0[t]|^2}} \approx 1$$

as $|H_0[t]|^2 \gg e_{serving}$. Similarly, $$\frac{e_{diff}}{|H_0[t]|^2 + e_{serving}} \approx 0.$$

Thus, the quotient is an estimate $\beta_A$ which is the more accurate the lower the interference from the colliding interfering cells (sum over $I_{coll,sched}$) and the lower the difference between $\rho_{A,n}$ and $\rho_{B,n}$ (sum over $I_{coll,sched}$).

In case that the communication terminal uses more than one antenna for reception, it may for example use the average of the received power values of the receive antennas.

The communication terminal may then use the estimates $\hat{\rho}_{A,RB}$ per resource block to determine an overall estimate, e.g. according to $$\hat{\rho}_A = \frac{1}{N_{selectRB}} \sum_{RB \in S_{selectRB}} \hat{\rho}_{A,RB}$$

where $S_{selectRB}$ is the set of resource block which the communication terminal uses for the averaging $N_{selectRB}$ is the number of elements in this set.

For determining the set $S_{selectRB}$, the communication terminal may take the scheduling of the interfering cells into account. For example, the resource blocks which it includes in the set $S_{selectRB}$ fulfill a certain resource block scheduling condition.

As can be seen, the highest accuracy of the estimate can typically be achieved if it is based only on resource blocks where all interfering cells are not scheduled since the sums over $I_{coll, sched}$ and $I_{non-coll, sched}$ in the above formula for $$\frac{P_{\rho_A} - P_{noise}}{P_{serving}}$$

vanish in this case i.e. if the set $S_{selectRB}$ only includes resource blocks where the interfering cells are not scheduled (see the simulation results discussed below).

In case that there are no resource blocks available which fulfill this condition the communication terminal may for example search for a resource block where the weakest non-colliding cell is scheduled but all other cells are unscheduled. The selecting scheduling condition may be further softened in this manner until a scheduling condition is found which is fulfilled for at least one resource block.

Alternatively, the communication terminal may combine multiple average estimates for different sets $S_{selectRB}$, e.g. corresponding to different scheduling conditions, and compute the final estimate as a weighted average of these estimates depending on the differences in interference strength of the resource blocks in the various sets.

The communication terminal may determine resource block scheduling information, based on which it for example selects the set $S_{selectRB}$ for example as follows.

For example, the detection of the interference scenario, i.e. the determination of the scheduling of a resource block in neighboring cells, is based on the estimates of $P_{\rho_A,RB}$ and $P_{noise,RB}$ for the resource block wherein of $P_{\rho_A,RB}$ may, alternatively to the definition given above, be estimated as $$P_{\rho_A,RB} = \frac{1}{N_{\rho_A,RB}} \sum_{t \in t^{\rho_A,RB}} |y(t)|^2 - \rho_{A,0} |\overline{H}_0|^2$$

for the purpose of interference scenario detection for a resource block for which a data transmission in the serving cell is scheduled. Here, $\overline{H}_0$ is the averaged channel estimate over the resource block.

For the determination of the scheduling of the resource block in neighboring cells, i.e. for the detection for which neighboring cells the resource block is scheduled for data transmission, the communication terminal compares these estimates with thresholds in a two-dimensional plane. The thresholds are computed by determining the expected receive power $P'_{\rho_A,RB}(S)$ and $P'_{noise,RB}(S)$ for every scenario s. For each expected power value, the nearest neighbor power values are determined, the average of these two values is computed and straight lines are placed through the average power values.

The expected power values can be determined as $$P'_{\rho_{A,RB}}(s) = \rho_{A,0} \cdot N_{CRS,0} + \sum_{m \in I_{coll}} \{INR_m - SNR + \rho_{A,m}\} \cdot S_m(s) +$$

$$\sum_{n \in I_{non-coll}} \{INR_n - SNR + \rho_{A,n}\} \cdot S_n(s)$$

and $$P'_{noise,RB}(s) = 1/SNR + \sum_{m \in I_{coll}} INR_m - SNR +$$

$$\sum_{n \in I_{non-coll}} \{\rho_{B,0}/\rho_{A,0} \cdot (INT_n - SNR + \rho_{A,n}) \cdot N_{CRS,n}\} \cdot S_n(s)$$

where $$S_k(s) = \begin{cases} 1 & \text{if aggressor } k \text{ is scheduled} \\ 0 & \text{if aggressor } k \text{ is not scheduled} \end{cases}$$

$INR_k$ is the interfere-to-noise ratio for interfering cell k and SNR is the signal-to-noise ratio for the serving cell.

There are overall $2^{N_{aggressor}} - 1$ scenarios and the values of $S_k(S)$ are set according to all possible scenarios (i.e. all possible combinations of the $S_k(S)$).

For the power scaling factors of the serving cell median values of the allowed ranges may be used.

The communication terminal can either operate on resource block level or on complete subframe level to detect ABS subframes of certain aggressor cells. For operation on a complete subframe it may average the power values over all resource blocks.

By comparing the estimated power values with the expected power values for all scenarios, the communication terminal may determine a scenario which most likely corresponds to the current situation.

Alternatively, the communication terminal may use higher layer information (e.g. from components of layer 3 according to the OSI/ISO reference model) to determine the resource block scheduling information, e.g. an ABS (Almost Blank Subframe) indication in an FeICIC (Further enhanced inter Cell Interference Coordination) scenario due to measurement restricted subframe information.

For a resource block with scheduled colliding cell, the communication terminal may also perform the estimation according to $$\hat{\rho}_{A,shd-coll} = \frac{P_{PA} - P_{noise} - P_{coll}}{P_{serving}}$$

where $$P_{coll} = \frac{1}{|N^{CRS}|} \sum_{t \in t^{CRS}} \sum_{m \in I_{coll}} |\hat{H}_m[t]|^2.$$

Assuming that $\rho_{A,n}$ is equal to $\rho_{B,n}$ for all cells in $I_{non-coll,sched}$. This gives as an estimate $$\frac{P_{PA} - P_{noise} - P_{coll}}{P_{serving}} = \rho_{A,0} + \frac{\sum_{m \in I_{coll,sched}} \rho_{A,m} \cdot |H_m[t]|^2 - \sum_{m \in I_{coll,sched}} |H_m[t]|^2}{|H_0[t]|^2 + e_{serving}}$$

-continued $$= \rho_{A,0} + \frac{\sum_{m \in I_{coll,sched}} (\rho_{A,m} - 1) \cdot |H_m[t]|^2}{|H_0[t]|^2 + e_{serving}}$$

Figure 7:
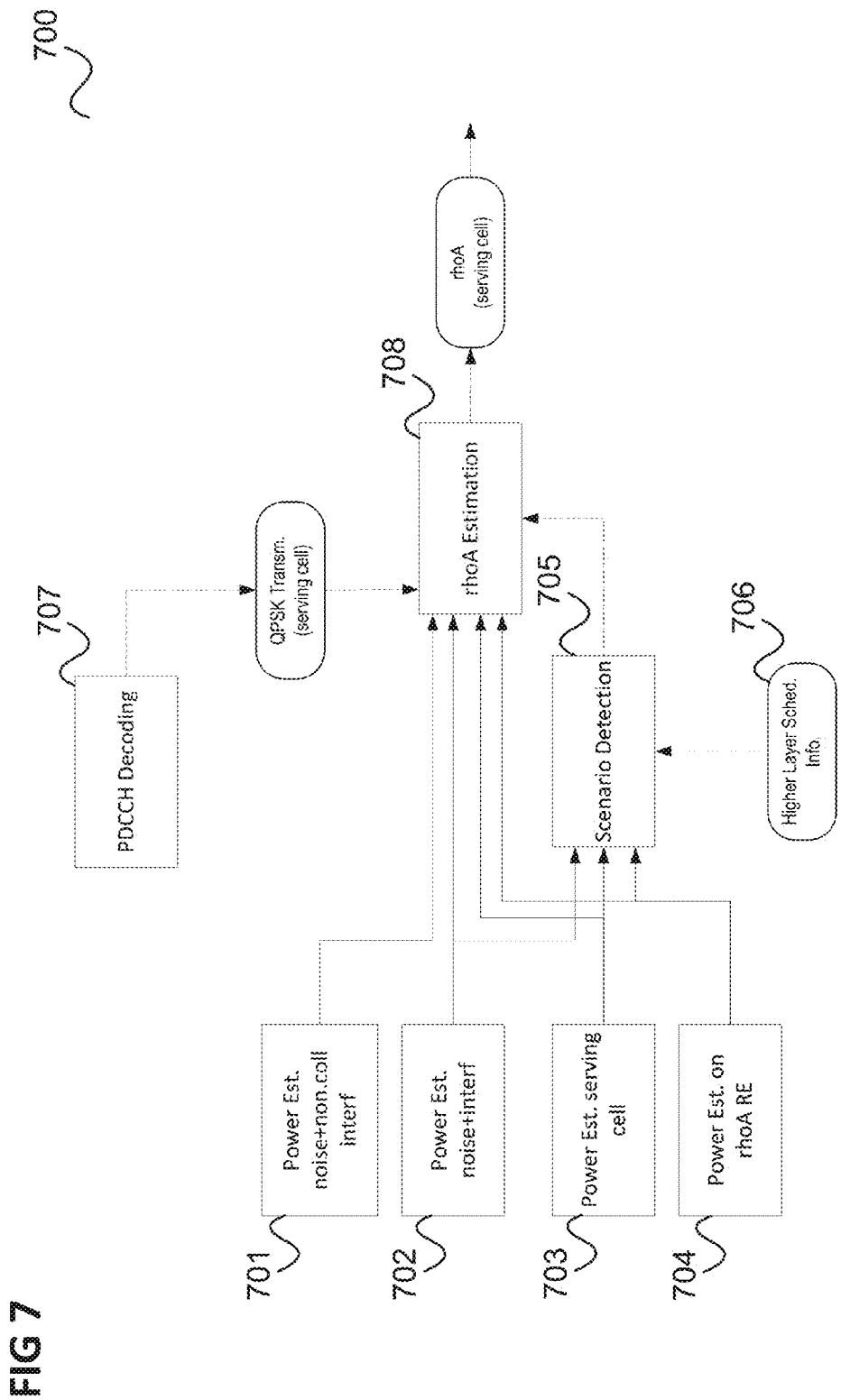
FIG. 7 shows a flow diagram illustrating an example for a power scaling factor estimation process.

An overview of an exemplary estimation process is given in FIG. 7.

FIG. 7 shows a flow diagram 700.

In 701, the communication terminal estimates the power of the interference from non-colliding interferers $P_{noise}$.

In 702, the communication terminal estimates the power of the interference from colliding interferers $P_{coll}$.

In 703, the communication terminal estimates the power of the serving cell $P_{serving}$.

In 704, the communication terminal estimates the power on the power on the resource elements scaled with $\rho_A$ $P_{\rho A}$.

In 705, the communication terminal uses the results of 702, 703 and 704 along with, in this example, higher layer scheduling information 706, for scenario detection, e.g. for the determination of the scheduling in the interfering cells.

In 707, the communication terminal decodes the PDCCH and determines whether the serving cell uses QPSK transmission.

If this is the case, the communication terminal, in 708, performs estimation of the power scaling factor $\rho_A$ in 708.

It should be noted that the estimation process may initially be used for estimation of the power scaling factor of the control region (e.g. the PDCCH), i.e. the OFDM symbols with index 0 and 1 in FIG. 4. After decoding of the PDCCH the estimation process is carried out for the PDSCH resource elements if the serving base station uses QPSK for transmission.

In the above example, the power scaling factor estimation is based on different power estimates most of which are used as well for the scenario detection. Accordingly, the algorithms for both power scaling factor estimation and scenario detection may for example implemented by means of a common architecture and the outputs of both can be obtained at the same time.

Figure 8:
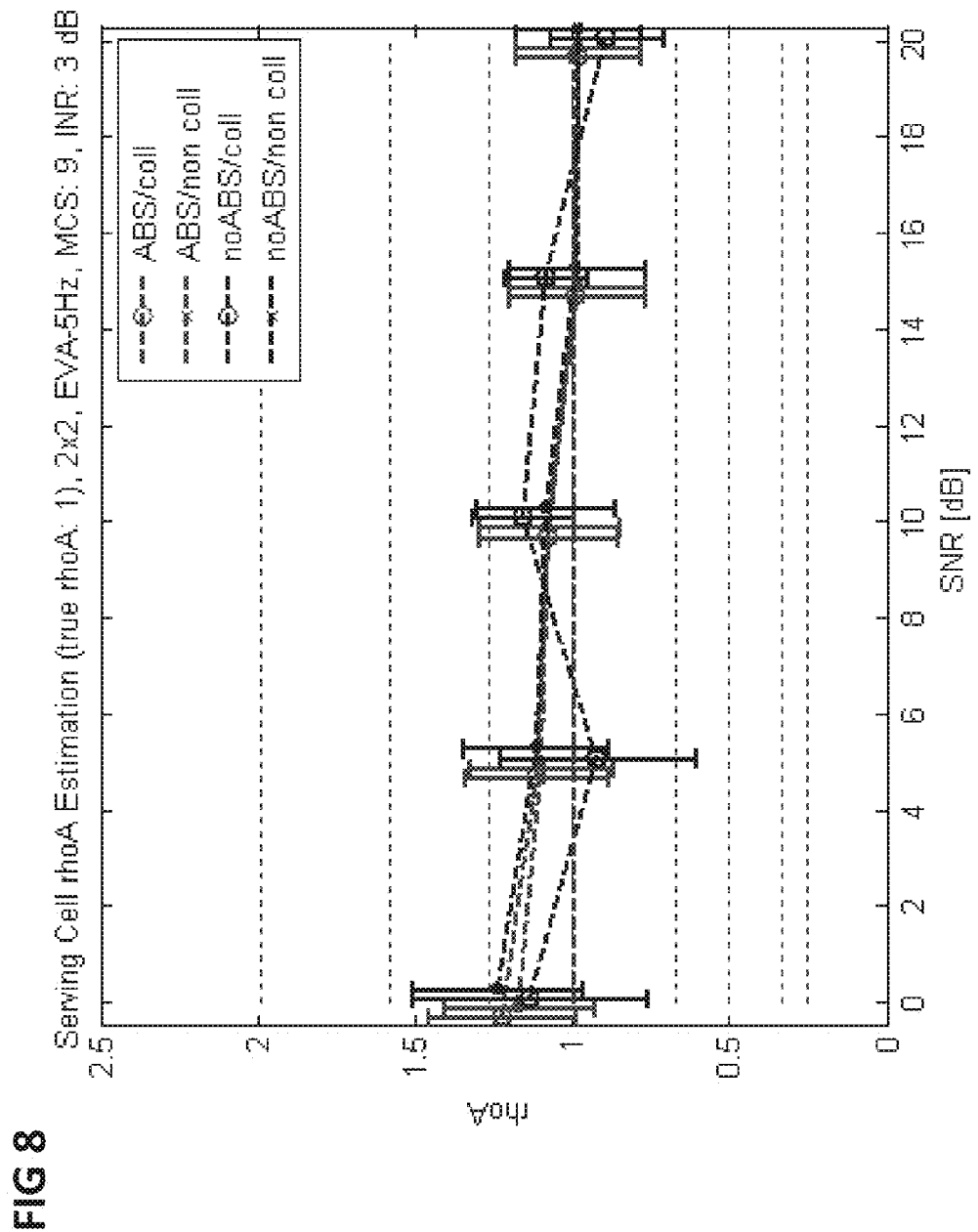
FIGS. 8 and 9 show simulation results for power scaling factor estimation for different scenarios with one aggressor.
Figure 9:
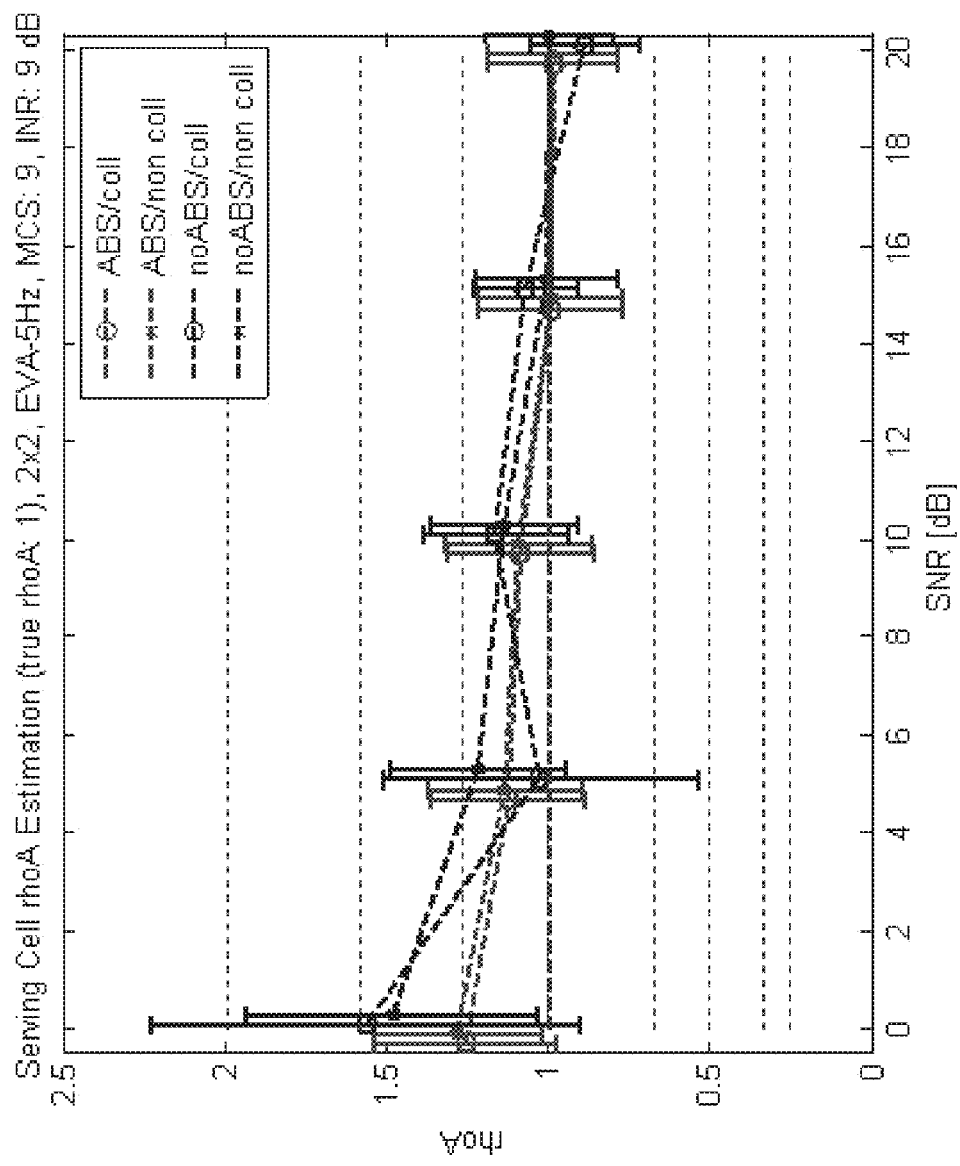

FIGS. 8 and 9 show simulation results for different scenarios with one aggressor (i.e. one interfering cell).

The results given in FIG. 8 are based on an interference to noise ratio (INR) of 3 dB while the results given in FIG. 9 are based on an INR of 9 dB.

In both FIGS. 8 and 9, results are given for the aggressor using colliding CRS (the corresponding curves are marked with "coll") and for the aggressor using non-colliding CRS (marked with "non coll" and for all resource blocks of the aggressor being scheduled (marked with "non ABS") and no resource blocks of the aggressor being scheduled (marked with "ABS"). The results given are based on the true power scaling value used by the eNodeB being 1. Other allowed power scaling values are marked by dotted horizontal lines.

It can be seen that the estimation provides a good accuracy for the two ABS scenarios. The non-colliding non-ABS scenarios as well give reasonable results whereas the colliding non-ABS scenarios show the largest errors.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal comprising:
    a receiver configured to receive a plurality of first signals on a first set of communication resources and to receive a plurality of second signals on a second set of communication resources; and
    an interference control unit configured to determine a level of interference of one or more interferers included in the plurality of second signals and to determine a power scaling factor of a plurality of signal components of the plurality of first signals based on the level of interference by the one or more interferers, wherein the plurality of signal components of the plurality of first signals are signals sent to the communication terminal by a base station operating the serving radio cell.

2. The communication terminal according to claim 1, wherein the interference control unit is further configured to cancel interference of the one or more interferers included in the first signals using the level of interference.

3. The communication terminal according to claim 1, wherein the interference control unit is configured to cancel influence of interference of the one or more interferers on reception power of the first set of communication resources using the level of interference on the second set of communication resources.

4. The communication terminal according to claim 1, wherein the level of interference on the second set of communication resources is a power level of interference and determining the power scaling factor comprises subtracting the level of interference from the power of the first signals and determining the power scaling factor based on the power resulting from the subtraction.

5. The communication terminal according to claim 4, wherein the interference control unit is configured to determine the power scaling factor based on a normalization of the power resulting from the subtraction.

6. The communication terminal according to claim 5, wherein the interference control unit is configured to normalize the power resulting from the subtraction by an estimate of the power of the plurality of first signals.

7. The communication terminal according to claim 1, wherein the first set of communication resources are a set of resource elements scheduled for the communication for reception of signals scaled with the power scaling factor.

8. The communication terminal according to claim 1, wherein the second set of communication resources are a set of resource elements scheduled for the communication for reception of signals scaled with a further power scaling factor different from the power scaling factor.

9. The communication terminal according to claim 1, wherein the second set of communication resources are a set of resource elements scheduled for the communication for reception of unscaled signals.

10. The communication terminal according to claim 1, wherein the first set of communication resources are a set of resource elements scheduled for the communication terminal for data reception.

11. The communication terminal according to claim 1, wherein the second set of communication resources are a set of resource elements scheduled for the communication terminal for pilot signal reception.

12. The communication terminal according to claim 1, wherein the communication terminal is served by a serving radio cell and the one or more interferers include other radio cells neighboring the serving radio cell.

13. The communication terminal according to claim 1, wherein the communication terminal comprises a selector configured to select the first set of communication resources and the second set of communication resources based on scheduling information about at least one of the one or more interferers.

14. The communication terminal according to claim 13, wherein the scheduling information specifies whether the at least one of the one or more interferers has scheduled data transmission using the first set of communication resources.

15. The communication terminal according to claim 13, wherein the first set of communication resources and the second set of communication resources are communication resources of a resource block and the selector is configured to select the resource block based on the scheduling information.

16. The communication terminal according to claim 1, being a user equipment according to a mobile communication standard.

17. The communication terminal according to claim 1, wherein the signal components of the plurality of first signals are signals sent to the communication terminal by an eNodeB according to a mobile communication standard.

18. A method for determining a power scaling factor, comprising:
    receiving a plurality of first signals on a first set of communication resources;
    receiving a plurality of second signals on a second set of communication resources;
    determining a level of interference of one or more interferers included in the plurality of second signals; and
    determining a power scaling factor of a plurality of signal components of the plurality of first signals based on the level of interference by the one or more interferers.

19. The method according to claim 18, further comprising canceling the interference of the one or more interferers included in the first signals using the level of interference.

20. The method according to claim 18, further comprising canceling influence of interference of the one or more interferers on reception power of the first set of communication resources using the level of interference on the second set of communication resources.

21. The method according to claim 18, wherein the level of interference on the second set of communication resources is a power level of interference and determining the power scaling factor comprises subtracting the level of interference from the power of the first signals and determining the power scaling factor based on the power resulting from the subtraction.

22. The method according to claim 18, further comprising determining the power scaling factor based on a normalization of the power resulting from the subtraction.

23. The method according to claim 22, further comprising normalizing the power resulting from the subtraction by an estimate of the power of the first signals.

* * * * *